April 2, 1957  J. W. BAUM  2,787,075
FISH LURES
Filed June 27, 1951  2 Sheets-Sheet 2
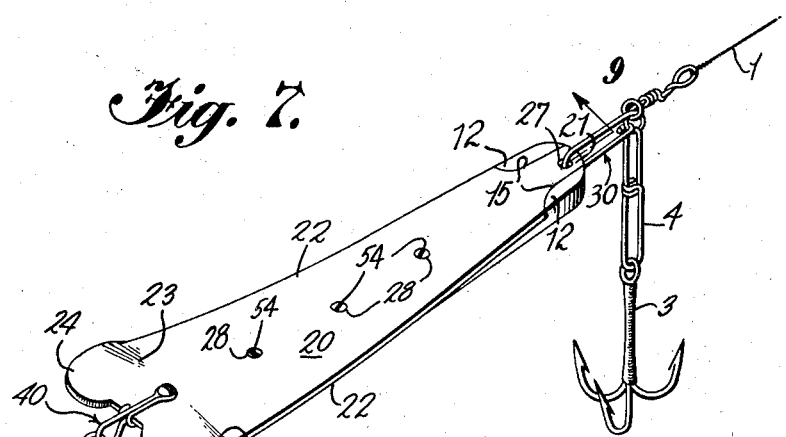
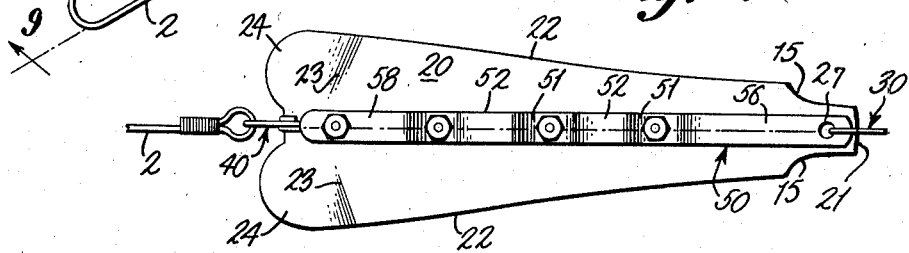
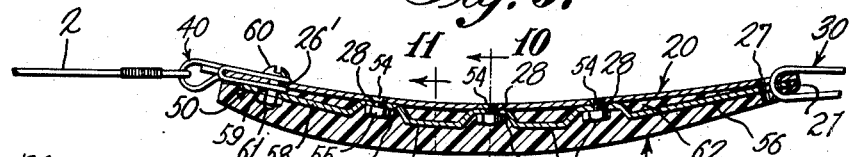
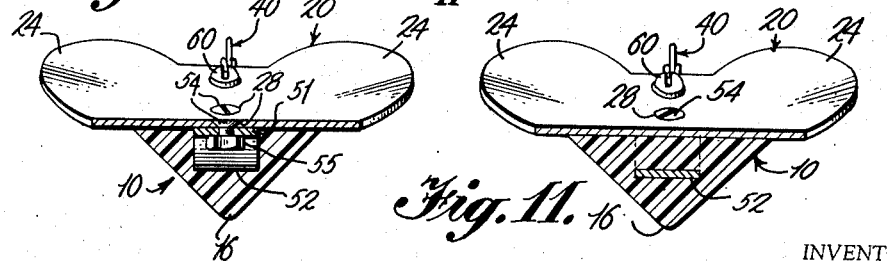
INVENTOR
John W. Baum
BY
ATTORNEYS

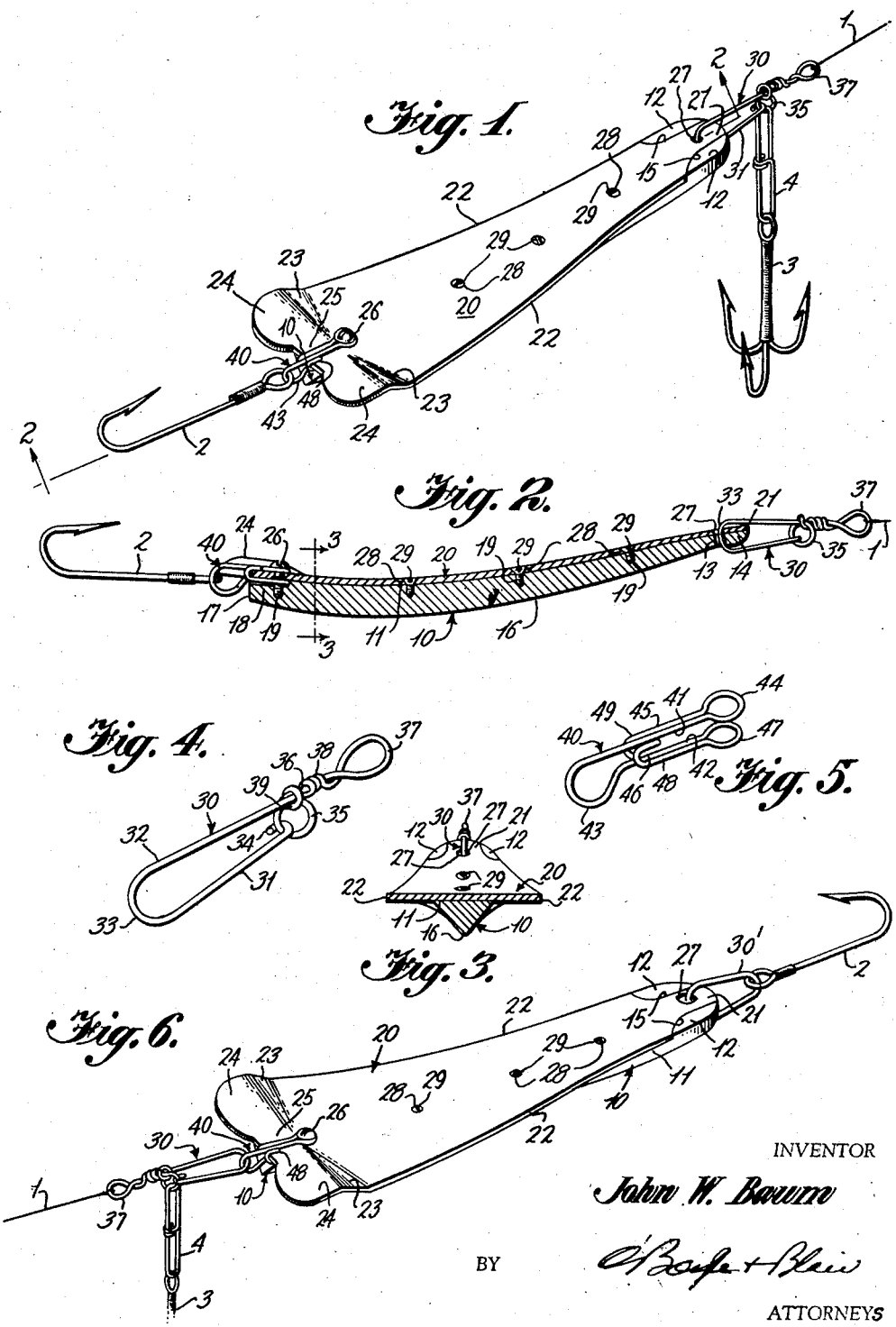

United States Patent Office 2,787,075
Patented Apr. 2, 1957

2,787,075

FISH LURES

John W. Baum, Eugene, Oreg.

Application June 27, 1951, Serial No. 233,879

2 Claims. (Cl. 43—42.5)

This invention relates to improvements in fish lures. More particularly, the invention relates to double-ended fish lures of the type disclosed and claimed in my application, Ser. No. 112,451, filed August 26, 1949, for Fish Lures, now Patent No. 2,633,659, issued April 7, 1953.

I have now found that a new fish lure, specially adapted for heavy duty use by commercial fishermen, and particularly suited for use in catching large game fish, can be made by utilizing the stabilizing plate of my prior lure construction as the sole tensile member, while retaining the original pisciform ventral body section. In the new construction, all the strain is placed on the dorsal stabilizing plate, which is desirably made of sheet metal, of suitable gauge thickness. Chrome-plated brass gives desirable results, but it is to be understood that the invention resides in the novel lure structure, and not in the surface finish of any of its parts.

The special features of novelty and advantage of the improved fish lure of the present invention will be more clearly understood by reference to the drawings, and accompanying description herein. In the drawings, like numerals refer to similar parts through the several views, of which:

Fig. 1 is a perspective view of one form of the novel fish lure and attachments associated with a trolling line;

Fig. 2 is a vertical section taken on line 2—2 of Fig. 1 showing self-tapping screws threaded into the ventral body section to secure the traction plate in place;

Fig. 3 is a transverse cross-section taken on line 3—3 of Fig. 2;

Fig. 4 is a detail showing of the snap connector of Fig. 1;

Fig. 5 is a detail showing of the hook wire of Fig. 1;

Fig. 6 is a view similar to Fig. 1, showing reversed leader and hook mountings;

Fig. 7 is a view similar to Fig. 1 of a modified fish lure;

Fig. 8 is a bottom view of the traction plate of the lure of Fig. 7, showing the method of securing the anchoring strip for the plastic body section;

Fig. 9 is a longitudinal section, taken on line 9—9 of Fig. 7, and showing a plastic body extruded and locked in place by the anchoring strip;

Fig. 10 is a transverse section taken on line 10—10 of Fig. 9; and

Fig. 11 is a transverse section taken on line 11—11 of Fig. 9, showing the interlocking of the extruded body section and the anchoring strip.

Referring more particularly to Figs. 1 to 6 of the drawings, one form of the novel fish lure herein comprises a plastic, wood, or metal body portion 10; a detachable stabilizer and traction plate 20, serving as a hook supporter and leader connector; a hook wire 30, and a snap connector 40 for the usual lead line. Hooks are attached to the hook wire and the snap connector. The member 20 may be made of any suitable sheet metal, such as brass, nickel or copper, and the like, and in any suitable finish, depending on the particular fishing conditions to be encountered.

The pisciform ventral body section 10 is provided with an upper deck section 11, having a raised front or prow section 12. The front section is rounded and is apertured, as shown at 13. It is centrally grooved or channeled, as shown at 14, the sides of the groove sweeping rearwardly in symmetrical everted curves 15. The body section has a keel 16, and is hydrodynamically balanced by reason of its being bilaterally streamlined. The rear end 17 is truncated, and a groove 18 is formed in the adjacent portion of the upper surface 11, to receive hook wire 40, as will be described more in detail hereinafter.

The combination traction and stabilizer plate 20 has a forward tongue section 21, fitted into groove 14 of the body of the lure. The plate 20 is provided further with symmetrical, flaring sides 22, extending laterally beyond the body and terminating in stepped, curvilinear lobes 24 leaving intermediate struck up portions 23. The stepped lobes or vanes are spaced by a flat section 25 generally conforming in width to the tail section 17 of the lure body and apertured to receive screw 26 tapped into the rearmost of threaded sockets 19 in the groove 18. The so-formed lobes serve as lifting vanes for the lure. The plate 20 is provided further with a forward aperture 27, in register with aperture 13 of the lure body, and a plurality of apertures 28, receiving screws 29 tapped into spaced threaded sockets 19 in the lure body, whereby the traction plate is secured in place on and to the ventral body section. The registering plate apertures and body sockets are in alignment in the central longitudinal axis of the lure. The upper surface 11 of the lure body is slightly curved, as shown, and the traction plate 20 is conformed thereto.

Because of the special curvilinear configuration of the lure and its stabilizing surface, special surfboard effects are obtained when the lure is trolled at the end of the fishing line. These effects are characterized by a darting, plunging vertical motion, coupled with an oscillating side to side swing, which movements are characteristic of the actions of frightened fish.

The lure is secured to a trolling line or leader 1, by snap connector 30, which is engaged in aperture 13 at the front end of the lure. A hook 2 is secured to the rear end of the lure by hook wire 40. Where desired, a second fish hook 3, may be secured to the snap link or connector 30, by a double looped connector 4, whose construction is detailed in my co-pending application, Ser. No. 112,451, filed August 26, 1949, for Fish Lures, now Patent No. 2,633,659, issued April 7, 1953. The hook 3, as shown, is three-pronged.

The snap connector 30 is of novel construction, being formed of a single piece of spring wire and is essentially comprised as follows: A pair of spaced legs 31, 32 are connected by an integral bend 33. The shorter leg 31 has a terminal hook 34 for snap engagement in loop 35, which is formed as a forward continuation of parallel leg 32. The wire of the loop is continued further to form a shank 36, and is then bent on itself to form a terminal loop or eye 37 to which the leader 1 is secured in any suitable manner. The rearwardly extending section 38 of the wire is wrapped around the shank 36, and terminates in a hook 39 which is wrapped around the forward end of leg 32 and the abutting section of loop 35, serving to lock them together, and stiffen the assembly.

The connector 30 is easily attached to and detached from the lure, the leg 31 being unhooked from its attachment in eyelet or loop 35 and threaded through aperture 13 in the lure body, after which the hook 34 is snapped in place. As already noted, extra connectors 4 can be secured in loop 35. In use, with the pull of line 1 on eyelet 37, a certain amount of spring and play will be permitted by the centrally looped section 35 of the connector. In other words, there is a yielding pull between eyelet 37 and the rear loop 33 which is engaged in the eyelet 13 of the lure body.

The hook connector 40, shown in detail in Fig. 5, is made of stainless steel spring wire or the like and comprises a pair of spaced, generally parallel legs 41, 42, interconnected by a depending loop section 43. The upper leg 41 is bent on itself to form a forward eyelet or loop 44 and a rearwardly extending leg 45 parallel to section 41 and terminating in a hook section 46. In like manner the bottom leg 42 is bent to form a second loop or eyelet 47, in vertical register with the loop 44 and a second leg section 48 parallel to section 42, the section 48 terminating in a hook section 49. It will be noted that the hook sections 46 and 49 are in lateral register and lie in the same plane as the parallel leg sections of the upper and lower arms.

As shown in the drawings, the hook connector 40 is used in the following manner. A fish hook 2 is threaded over either of the top or bottom sections of the device until it is hung in place in and by loop 43. The connector is then fitted in place over the central rear section 25 of the plate 20 with loops 44 and 47 in register with rearmost aperture 19 in the body section 10 and the aligned aperture in the plate 20. Screw 26 is then inserted in place and secures the connector rigidly to the lure. It will be noted that the hook sections 46, 49 of the hook connector are severally fitted on and over the edge of section 25 of the plate 20 and provide a three-point stabilizing bearing for the connector with the aligned loops 44, 47. Thus, the hook connector is rigidly secured in place and serves to support the hook 2 as a freely movable member. Because of the simplicity of the construction the snap connectors 30 and hook connectors 40 can be made of wire of different gauges which can be readily fitted in place on the lure when it is desired to shift from one type to another for different types of fishing. Because the transmission of all traction from one end of the lure to the other is solely through the stabilizer and traction plate 20, no stresses or strains are imposed on the ventral body section 10 and the latter can be made of any suitable lightweight material to which any desirable surface finish may be imparted.

For heavy duty or commercial fishing the form or arrangement shown in Fig. 6 is made use of. It will be noted that the leader 1 is connected through snap connector 30 to hook connector 40 at the rear or wide end of the lure, and hook 2 is placed at the other end and is connected through connecting ring 50 which is threaded through eyelet 51 inserted in aperture 13 and serving to hold plate 20 in place while taking the pull of the hook and any fish thereon so that no traction is applied to any portion of the relatively weak body section but is concentrated solely in a direct pull on the stabilizer or surface plate.

Referring now to Figs. 7 to 11, there is shown a modified fish lure, in which a special anchoring strip is secured to the dorsal stabilizer plate, and a plastic, ventral body section is extruded in place on and over the under surface of the stabilizer plate and in and around locking segments of the anchoring strip, whereby the body is permanently locked to the stabilizer plate.

The dorsal stabilizer plate and the central body section are structurally and functionally identical with the elements of the lure of Figs. 1 to 6, and will be so identified, the modification residing in the use of a plastic body and the special anchoring means therefor, which will now be described.

The novel anchoring strip 50 is made of flat spring sheet metal, of suitable width, as shown. In the preferred form herein, the strip is bent to form three raised spacer segments, in the center portion thereof, and designated generally by the numeral 51. These spacer segments define a pair of loops 52, and are tapped, as indicated at 52, to receive flat headed screws 54 which pass through registering apertures 28 in tractor plate 20. The screws 54 are fastened in place with nuts 55, which lock spacer segments 51 in place on the under surface of dorsal plate 20, and thereby lock the strip 50 to the plate. The anchor strip 50 is provided further with front and rear tongue sections 56, 58, severally apertured, as indicated at 57, 59, to register with apertures 27 and 26′ in plate 20. It will be seen that when tongues 56, 58 are apposed to the plate, with section 58 locked in position over hook connector 40 by machine screw 60 and attached nut 61, a pair of end loops 62, 63, will be formed, and will cooperate with center loops 52 to receive and lock extruded body plastic in place, as shown in Figs. 9 and 11, whereby the body 10 is permanently secured on and to the stabilizer plate 20 to form a unitary lure structure.

It will now be appreciated that there have been provided novel, double-ended fish lures, which are especially adapted for heavy duty hand line fishing for salmon and other game fish, which are characterized by novel lure bodies free from any tendency to rotate or spin and exhibiting the normal darting action of a frightened fish during use. It will also be appreciated that there have been provided novel wire connectors for the fishing lines and for the hooks, the line connector comprising a self-locking spring wire connector of novel construction having an intermediate loop serving as a point of attachment for a jumper or other hook harness for a fish hook, while the novel hook connector comprises a spring wire loop member detachably secured on and over the rear edge of the novel stabilizer and traction plate, whereby all tension or pull from the rear hook to the leader is directed rectilinearly through the metal mass of the combination stabilizer and traction plate.

It will be appreciated further that there has been provided a unitary fish lure incorporating the novel structural features of the present invention, and characterized by a molded or extruded body, cast, or otherwise formed in place on and against the under surface of the combination traction plate and stabilizer forming the dorsal aspect of the lure.

I claim:

1. A fishing lure of the character described, comprising a unitary pisciform ventral body having a bowed dorsal surface, the fore portion of the lure being stepped and having a recess in the dorsal surface thereof, the aft portion of said surface having a groove therein, a stabilizer plate positioned on the dorsal surface and secured to the body of the lure, said plate having an elongated rearwardly flared body terminating in a stepped tail section, the opposite end of said plate having a reduced portion seated in said recess of the fore dorsal surface, the plate being bent upwardly and outwardly in the vicinity of the tail section, the outwardly extending portion thereof being flat and formed with symmetrical bilateral co-planer lobes, and a fish hook receiving wire seated in the grooved aft portion of the dorsal surface of the lure and secured to the tension plate.

2. A fishing lure of the character described, comprising a unitary pisciform ventral body section formed from plastic material and having a bowed dorsal surface, a stabilizer plate positioned on said surface, said plate having an elongated flared body terminating in a stepped tail section, the plate being bent upwardly and outwardly in the vicinity of the tail section, the outwardly extending portion thereof being flat and formed with symmetrical bilateral co-planer lobes, and means to fixedly secure the plate to the body section of the lure comprising a looped anchoring strip attached to the under side of the plate, the looped portions of said strip being embedded in and locked to the plastic body section.

References Cited in the file of this patent

UNITED STATES PATENTS

| | | |
|---|---|---|
| Re. 15,204 | Dubrow | Oct. 11, 1921 |
| 1,476,139 | Bingham | Dec. 4, 1923 |
| 1,638,215 | Rodgers | Aug. 9, 1927 |
| 1,728,560 | Goshorn | Sept. 17, 1929 |
| 1,950,672 | Hanson | Mar. 13, 1934 |
| 2,003,976 | Raymond | June 4, 1935 |
| 2,021,796 | Liotta | Nov. 19, 1935 |
| 2,124,152 | Salm | July 19, 1938 |
| 2,150,074 | McLure | Mar. 7, 1939 |
| 2,214,409 | Eaby | Sept. 10, 1940 |
| 2,264,211 | La Chance | Nov. 25, 1941 |
| 2,298,811 | Sisco | Oct. 13, 1942 |
| 2,500,707 | Rosinski | Mar. 14, 1950 |

FOREIGN PATENTS

| | | |
|---|---|---|
| 84,488 | Sweden | Oct. 1, 1935 |